June 19, 1934.    G. B. WATKINS    1,963,601
LAMINATED GLASS
Filed May 21, 1930    2 Sheets-Sheet 1
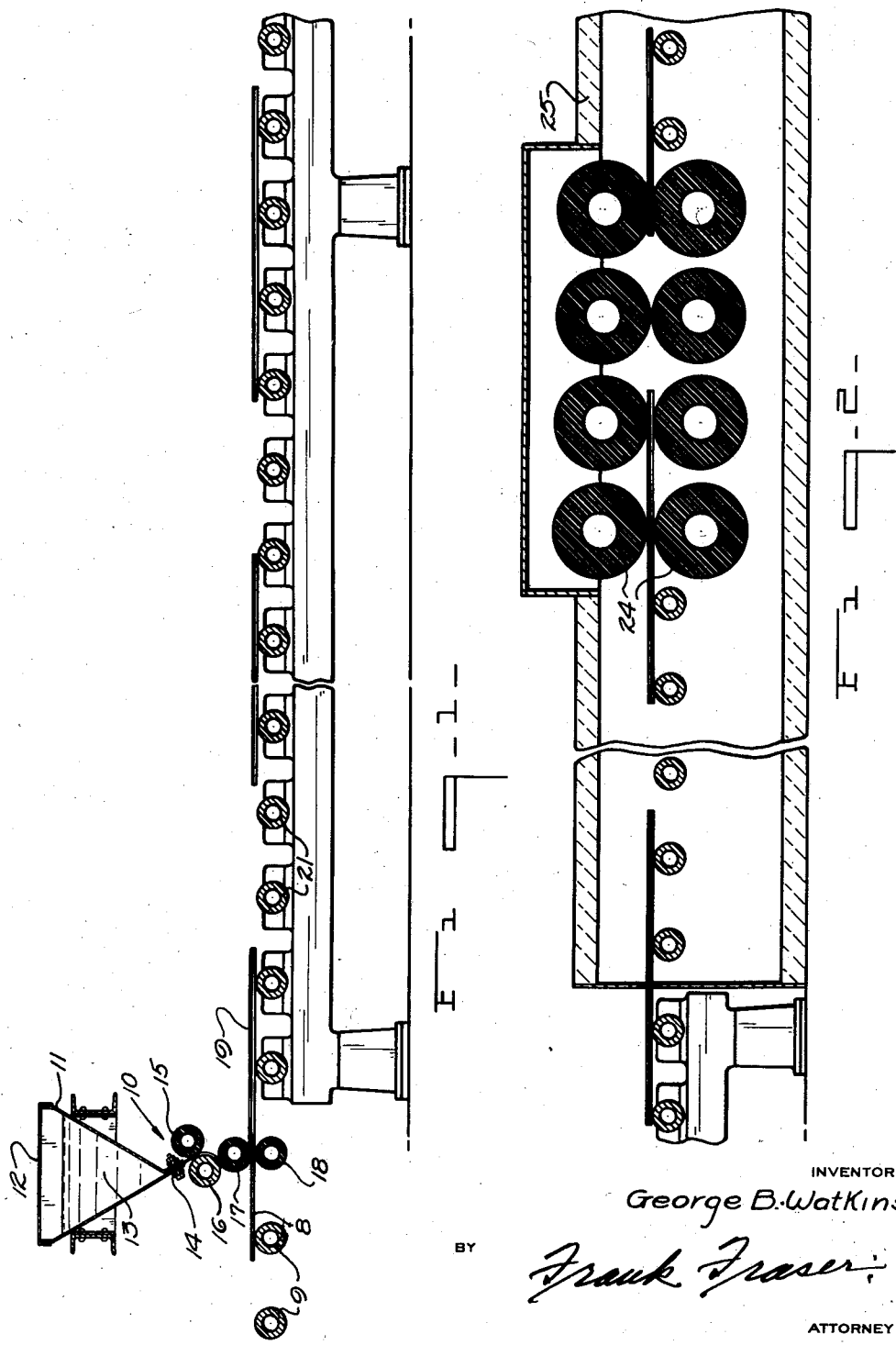
INVENTOR
George B. Watkins
BY Frank Fraser
ATTORNEY June 19, 1934.  G. B. WATKINS  1,963,601
LAMINATED GLASS
Filed May 21, 1930  2 Sheets-Sheet 2
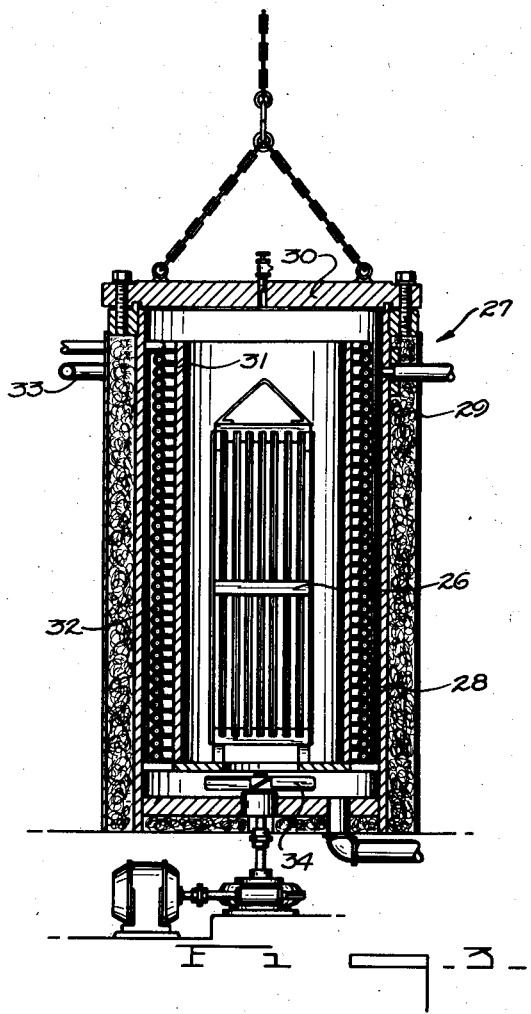
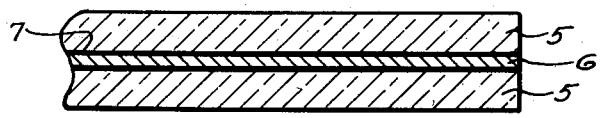
INVENTOR
George B. Watkins
BY
Frank Fraser
ATTORNEY Patented June 19, 1934

1,963,601

UNITED STATES PATENT OFFICE 1,963,601

LAMINATED GLASS

George B. Watkins, Toledo, Ohio, assignor to Libbey-Owens-Ford Glass Company, Toledo, Ohio, a corporation of Ohio Application May 21, 1930, Serial No. 454,266

12 Claims. (Cl. 49—81)

The present invention relates to a new resinous-like material and to the process of producing the same, and to the utilization of a gelatin compound or mixture in the manufacture of laminated glass.

The expression "laminated glass" is used to designate a composite structure usually consisting of two or more sheets of glass with one or more interposed non-brittle membranes such as pyroxylin plastic sheets. The value of such a composite structure is dependent, among other things, upon the adequacy and permanency of the bond between the laminations, clearness of vision, and stability of the sheet.

It is an object of the present invention to provide a process and apparatus for producing laminated glass wherein the bond inducing medium or bonding agent can be applied easily and by mechanical means if desired. The invention also contemplates the use of a gelatin solution produced without employing water as a solvent therefor, which solution, after it is applied to the laminations, does not require drying, thereby reducing to a minimum the possibility of introduction of dirt between the laminations. By the use of my improved mixture and method of applying, the resultant composite sheet possesses an exceptionally tenacious bond, the sheet is exceedingly stable, and clear to vision, and possesses considerable resistance to bacterial decomposition when exposed to atmospheric conditions.

In addition to the above advantages, my improved process is such that the cost of manufacturing laminated glass is relatively low because of the few operations required.

Other objects and advantages of the invention will become more apparent during the course of the following description when taken in connection with the accompanying drawings.

In the drawings wherein like numerals are employed to designate like parts throughout the same, Fig. 1 is a vertical longitudinal section through one form of apparatus that can be employed to deposit my improved mixture upon the laminations, Fig. 2 is a similar section showing a roller pressing mechanism that may be used, Fig. 3 is a vertical transverse section through an autoclave, and Fig. 4 is a diagrammatic fragmentary sectional view of the finished sheet.

As far as I am aware, all attempts to produce laminated glass by the use of gelatin as an adhesive made use of water as a solvent for the gelatin. The introduction of water as a solvent for the gelatin into a composite sheet is, in my opinion, objectionable and I have therefore developed a mixture or solution including gelatin wherein water is not used as a solvent for the gelatin.

It has been found that a new resinous-like material can be produced by dissolving commercially dry gelatin in a suitable organic solvent or mixture of solvents without the use of water, said solvent or mixture of solvents also preferably having characteristics of being solvent toward cellulose compounds. While it is not desired to unnecessarily limit the instant invention to the particular solvent or solvents used, it is pointed out that the following solvents have been found to work satisfactorily for dissolving commercially dry gelatin. For example, mixtures of polyglycols such as diethylene glycol and polyhydric alcohols such as glycerol in the approximate ratio of 5 to 1 by weight can be employed.

It has been found that approximately 4% of commercially dry gelatin can be dissolved in the above solvent mixture if carried out in the following manner:

Approximately 20% granulated gelatin by weight is reacted with vigorous stirring in glycerol at a temperature of approximately 100° C. until a stiff homogeneous gel is produced. This gel is a resinous-like material, and I call particular attention to the fact that such gel is produced by reacting the gelatin with glycerol in the absence of any water, and in this particular instance, no solvents or liquids other than the glycerol. This resinous-like material is transparent and substantially colorless, possesses remarkably good adhesive characteristics to surfaces such as glasss, and is very tough and elastic. One of the uses to which this resinous-like material can be put is in the manufacture of laminated glass.

To render the resinous-like substance liquid, approximately 20% thereof by weight is dissolved or dispersed in diethylene glycol, the resultant solution being liquid at slightly elevated temperatures, and can be applied directly to clean surfaces of glass as will be more fully set forth hereafter.

One of the advantages of the present invention is that my improved mixture can be applied to the glass surfaces mechanically in contradistinction to spraying or dipping thereof. While it is not intended to infer that this mixture must of necessity be applied mechanically, the fact that it can be so applied is of distinct advantage.

Laminated glass has been produced by using this liquid by directly applying mechanically the solution to the clean surfaces of the glass, after which an uncoated sheet of pyroxylin plastic is interposed between the coated surfaces of the glass without drying to produce a sandwich which is preferably subjected to the combined action of heat and pressure to bond the laminations together. The fact that it is not necessary to dry the coating or film of the liquid deposited upon the glass is another decided advantage because it reduces to a minimum the hazard of dirt. It is practically impossible to dry a film or coating of liquid without some dirt coming in contact therewith and as such dirt remains in the finished sheet, the objections thereto are readily apparent. Furthermore, by eliminating drying, it is unnecessary to provide heating equipment or floor space therefor, time, labor, etc. which is a considerable saving.

An excellent bond is obtained with the above adhesive, but occasionally a slightly hazy condition shows up in the laminated sheet which hazy condition I attribute to what may be termed an excessive amount of glycerol compared to the gelatin at the interface between the glass and pyroxylin plastic surface. As the diethylene glycol is a solvent for nitro-cellulose, it is, relatively speaking, readily absorbed by the plastic during the application of heat and pressure, leaving in the main, gelatin and glycerol at the interface.

It has been found in the case of the above mixture that the smallest ratio of glycerol to gelatin is approximately 4 to 1 in order to get a homogeneous solution when 4% by weight of commercially dry gelatin is dissolved in the organic solvents. The problem of obtaining a solution of gelatin containing a smaller amount of glycerol was solved by the addition of relatively small amounts of certain salts which, it has been found, will dissolve in diethylene glycol in varying concentrations at slightly elevated temperatures. The diethylene glycol containing the small amount of salt will dissolve commercially dry gelatin fairly readily by itself. However, a small amount of glycerol aids materially in getting a homogeneous solution. In any event, no water is used to get the commercially dry gelatin into solution.

By the addition of as litttle as .1% by weight of calcium chloride to diethylene glycol, it is possible to dissolve 4% by weight of commercially dry gelatin and 2% pure glycerol. Such a solution, when coated in thin films upon clean glass surfaces assembled in sandwich form with an interposed sheet of pyroxylin plastic and pressed at an elevated temperature, will produce a laminated sheet having an exceptionally fine bond, clear to vision, and exceedingly stable, and possessing considerable resistance to bacterial decomposiiton when exposed to atmospheric conditions.

By way of example, it is set forth that a kilogram of the above solution may be produced as follows: One gram of calcium chloride is dissolved in approximately 80 grams of diethylene glycol at a temperature approximating 100° C. To this solution of diethylene glycol and salt (such as calcium chloride) 20 grams of chemically pure glycerol are added, followed by the addition of 40 grams of preferably granulated commercially dry gelatin. The addition of the gelatin to the solvent mixture is carried out slowly with constant stirring, the solvent mixture being maintained in the neighborhood of 90° C. After the addition and solution of the gelatin has proceeded to the point where a homogeneous gel-like mass results, sufficient diethylene glycol is added with stirring to make up one kilogram of the adhesive. As has above been pointed out, no water is used in getting the gelatin into the desired solution and this is a decided step forward in the art.

In addition to the calcium chloride mentioned above, it has been found that such salts as barium chloride, manganous, and cerium chloride can be used. The role played by the salts in aiding the solution of gelatin in mixtures of polyhydric alcohols and polyglycols is not definitely known, although it is believed the reaction is catalytic in nature rather than any definite chemical reaction in view of the exceedingly small quantities required to produce results.

An important advantage in the use of gelatin solution above described in the manufacture of laminated glass is its resistance to bacterial decomposition when exposed to atmospheric conditions. Solutions of the above adhesive or bonding agent have been exposed for months and are apparently as free from bacterial action as they were the day they were made. On the contrary, a 4% solution of gelatin in water will start bacterial decomposition in a relatively short time when exposed to normal atmospheric conditions. It is believed that the advantage of my improved adhesive over a gelatin solution made by dissolving gelatin in water when used in the manufacture of laminated glass are obvious.

Referring more particularly to the drawings, in Fig. 4 the numeral 5 is used to designate the sheets of glass between which is interposed a non-brittle sheet 6 such as a cellulose composition material, for example pyroxylin plastic. The glass sheets and non-brittle membrane are bonded together by the film or coating 7. It will, of course, be understood that the drawings set forth the films 7 in an exaggerated manner as the films in the finished sheet, which Fig. 4 represents diagrammatically, are considerably thinner and therefore less noticeable than those illustrated.

To produce a sheet of laminated glass in accordance with the present invention and as is shown in Fig. 1, the sheets of glass 8 may be carried upon a conveyor, such as the rolls 9, under the film depositing apparatus designated in its entirety by the numeral 10. This apparatus consists preferably of a supply hopper 11 provided with the cover 12 and adapted to contain a solution of my improved resinous-like material 13. It is considered desirable to provide the hopper with temperature controlling means so that the temperature and therefore the viscosity or fluidity of the solution can be accurately controlled to give uniform results. However, it is not absolutely necessary to successful operation that temperature controlling means be utilized, although as above stated, such use is to be preferred.

It is desirable that the trough or receptacle 11 be approximately the same length as the length of the rolls 9 and the container is provided with the discharge outlet 14 at the lower end thereof. The discharge spout is adapted to direct a flow or deposit of the resinous-like material solution onto or between the rolls 15 and 16. The roll 15 is preferably a rubber or other flexible roll, while the roll 16 is preferably metallic. The roll 16 is also associated with a second roll 17 having characteristics which may be the same as those of the roll 15. It has been found that the combination of rubber and metallic rolls just described gives decidedly better results than the use of all metallic rolls or all rubber rolls. However, the construction and operation of this film forming or coating apparatus is made the subject-matter of another application of mine filed of even date herewith. For the purpose of the instant application, it is sufficient to point out that the coating apparatus will deposit a relatively very uniform film upon the glass sheet passing thereunder. This apparatus is particularly useful in applying the solution formed from my improved resinous-like material above described.

Placed in opposition to the roll 17 of the coating apparatus is a conveyor roll or other device 18 so that the sheet of glass 8 is coated with the film 19 as it is moved between the rolls 17 and 18. The spreading of the adhesive solution upon the glass with this coating apparatus is referred to by me as a mechanical application of the solution in contradistinction to the dipping or spraying of such solution onto the glass. However, as has already been mentioned, the use of this improved gelatin solution is not necessarily dependent upon the application thereof by means of the coating machine.

It is pertinent to note, however, that by applying the solution onto the glass in this manner, the tendency toward the introduction of dirt into the film is reduced to a minimum, and furthermore it has been found that this coating device prduces a relatively very uniform deposit or film upon the glass with very little effort. As a matter of fact, it is only necessary to feed the glass through the rolls to get such a uniform deposit. Also, by proper control of the discharge spout and the adjustment of the rolls, the exact amount of material placed upon the glass is easily controlled.

The coated glass can be assembled with the non-brittle material immediately upon issuance of the glass from between the rolls. In other words, there is no necessity for drying or otherwise treating the deposit upon the glass because it can be used immediately after the coating operation. Here again, the tendency toward the introduction of dirt into the film and therefore the finished sheet is reduced to a minimum.

It is therefore preferred that as soon as the coated glass leaves the film applying machine, it be assembled with the other laminations to produce a sandwich. It will be understood that the prompt assembling of the coated glass is to eliminate dirt hazard and not because the film is of such character that it must be assembled promptly to get the desired bond.

The expression "sandwich" is used in the art to designate the properly superimposed laminations before they have been bonded together. The sandwich, in accordance with the present invention, is produced by interposing the non-brittle material between the film coated surfaces of the glass plates. To produce the finished composite structure, the sandwich is then preferably subjected to the combined action of heat and pressure.

While it is not necessary that any particular pressing medium be employed, nevertheless it is preferred that an autoclave be used for this purpose. If an autoclave is used and the glass is arranged unprotected in the fluid in the autoclave, it is desirable to first subject the sandwich to a so-called preliminary pressing operation.

To this end, a plurality of pairs of rolls 24 are illustrated, the rolls being preferably resilient and between which the sandwich may be passed to remove air, etc. The adhesiveness of the bonding agent will be sufficient to hold the laminations together, and of course if sufficient pressure is applied to the sandwich to remove the air, atmospheric pressure will prevent separation of the laminations. The pairs of rolls 24 are illustrated as being positioned within a compartment 25, whose temperature may be controlled as desired.

After the preliminary pressing of the sandwich, it may be placed in a removable rack 26 which can be put into and taken out of the autoclave 27. The construction of the autoclave does not constitute a part of the present invention. It will be noted that the autoclave illustrated, however, consists of the tank 28 surrounded by an insulated covering 29 and having a removable top 30. Placed within the tank 28 is a spaced wall or partition 31 and between this partition and the casing 28, the heat exchanger system 32 is arranged. The heat exchanger system has connection with suitable source of outside supply means through the conduits 33. An agitator 34 may be placed in the bottom of the tank to cause a proper circulation of the pressing fluid through the autoclave.

In operation, the rack of glass is placed into the autoclave when the top 30 is in opened position, and after the rack has been put in place, the top is clamped down and the autoclave is filled up with the fluid and heated to the desired temperature, being circulated to give a substantially uniform temperature throughout the entire autoclave. It is preferred that if a number of sandwiches are being pressed at the same time, they be arranged in spaced relation in the rack 20 so that a circulation of the pressing fluid will take place around each sandwich.

It has been found that a pressing cycle consisting of approximately 225 pounds per square inch for ten minutes at about 240° F. will give excellent results. After the sheets have been made in this manner, they may be undercut, and sealed if desired.

With the type of mixture or solution above described, the solvent used, such as diethylene glycol, acts upon the surfaces of the pyroxylin plastic or other cellulose composition material. The solvent action is such that there is, in effect, a cellulose cement created on the surface of the plastic. Further, the gelatin in the solution adheres strongly to the glass surfaces and likewise the cement formed on the surface of the plastic adheres to the gelatin so that a strong and permanent bond between the laminations is obtained.

While the process has been described by setting forth that the coating is applied to the surfaces of the glass, it will of course be appreciated that this coating can be applied to the surfaces of the non-brittle membrane instead of to the glass, and in fact such coating can be applied to bond the glass and the plastic membrane. It will therefore be understood that the claims are intended to cover the application of the bonding agent to any or all of the laminations.

1. The process of producing laminated glass consisting in reacting gelatin in a polyglycol and without the use of water, then depositing the solution on one surface each of two sheets of glass, interposing a layer of cellulose ester between the coated surfaces of the two glass sheets, and then subjecting the sandwich thus formed to the combined action of heat and pressure to produce a composite structure.

2. The process of producing laminated glass consisting in reacting gelatin in diethylene glycol and without the use of water, then depositing the solution on one surface each of two sheets of glass, interposing a layer of cellulose ester between the coated surfaces of the two glass sheets, and then subjecting the sandwich thus formed to the combined action of heat and pressure to produce a composite structure.

3. The process of producing laminated glass consisting in reacting gelatin in a polyglycol in the presence of a salt but in the absence of water, then depositing the solution on one surface each of two sheets of glass, interposing a layer of cellulose ester between the coated surfaces of the two glass sheets, and then subjecting the sandwich thus formed to the combined action of heat and pressure to produce a composite structure.

4. The process of producing laminated glass consisting in reacting gelatin in a solvent in the presence of a salt but in the absence of water, then depositing the solution on one surface each of two sheets of glass, interposing a layer of cellulose ester between the coated surfaces of the two glass sheets, and then subjecting the sandwich thus formed to the combined action of heat and pressure to produce a composite structure.

5. The process of producing laminated glass consisting in reacting gelatin in diethylene glycol in the presence of a salt but in the absence of water, then depositing the solution on one surface each of two sheets of glass, interposing a layer of cellulose ester between the coated surfaces of the two glass sheets, and then subjecting the sandwich thus formed to the combined action of heat and pressure to produce a composite structure.

6. The process of producing laminated glass consisting in reacting gelatin, a polyglycol, and a polyhydric alcohol without the use of water, then depositing the solution on one surface each of two sheets of glass, interposing a layer of cellulose ester between the coated surfaces of the two glass sheets, and then subjecting the sandwich thus formed to the combined action of heat and pressure to produce a composite structure.

7. The process of producing laminated glass consisting in reacting gelatin, a polyglycol, a polyhydric alcohol, and a salt without the use of water, then depositing the solution on one surface each of two sheets of glass, interposing a layer of cellulose ester between the coated surfaces of the two glass sheets, and then subjecting the sandwich thus formed to the combined action of heat and pressure to produce a composite structure.

8. The process of producing laminated glass consisting in putting gelatin and a polyglycol into solution in the absence of water, depositing said solution upon one surface each of two sheets of glass, interposing a layer of cellulose ester between the coated surfaces of the glass sheets without permitting the said coating to dry, and then subjecting the sandwich thus formed to the combined action of heat and pressure to produce a composite structure.

9. The process of producing laminated glass consisting in putting gelatin and diethylene glycol into solution in the absence of water, depositing said solution upon one surface each of two sheets of glass, interposing a layer of cellulose ester between the coated surfaces of the glass sheets without permitting the said coating to dry, and then subjecting the sandwich thus formed to the combined action of heat and pressure to produce a composite structure.

10. The process of producing laminated glass consisting in putting gelatin and glycerol into solution in the absence of water, depositing said solution upon one surface each of two sheets of glass, interposing a layer of cellulose ester between the coated surfaces of the glass sheets without permitting the said coating to dry, and then subjecting the sandwich thus formed to the combined action of heat and pressure to produce a composite structure.

11. As a new article of manufacture, a sheet of laminated glass comprising two sheets of glass each having a coating thereon formed from a mixture consisting of gelatin reacted in a polyglycol without the use of water, and a cellulose ester layer positioned between the coatings and united thereto.

12. As a new article of manufacture, a sheet of laminated glass comprising two sheets of glass each having a coating thereon formed from a mixture consisting of gelatin reacted in diethylene glycol without the use of water, and a cellulose ester layer positioned between the coatings and united thereto.

GEORGE B. WATKINS.